(12) United States Patent
Dougan

(10) Patent No.: US 9,579,988 B2
(45) Date of Patent: Feb. 28, 2017

(54) WORK VEHICLE

(71) Applicant: Komatsu Ltd., Tokyo (JP)

(72) Inventor: Yoshihiro Dougan, Oyama (JP)

(73) Assignee: Komatsu Ltd., Tokyo (JP)

(*) Notice: Subject to any disclaimer, the term of this patent is extended or adjusted under 35 U.S.C. 154(b) by 589 days.

(21) Appl. No.: 14/123,814

(22) PCT Filed: Aug. 2, 2013

(86) PCT No.: PCT/JP2013/071064
§ 371 (c)(1),
(2) Date: Dec. 4, 2013

(87) PCT Pub. No.: WO2015/015647
PCT Pub. Date: Feb. 5, 2015

(65) Prior Publication Data
US 2016/0221454 A1 Aug. 4, 2016

(51) Int. Cl.
B60K 6/445 (2007.10)
B60L 11/18 (2006.01)
(Continued)

(52) U.S. Cl.
CPC ......... B60L 11/185 (2013.01); B60L 11/1816 (2013.01); B60L 11/1818 (2013.01);
(Continued)

(58) Field of Classification Search
CPC B60L 11/185; B60L 11/1818; B60L 11/1838; B60L 8/003; B60K 6/445;
(Continued)

(56) References Cited

U.S. PATENT DOCUMENTS 8,779,719 B2 7/2014 Matsuki
2008/0315538 A1* 12/2008 Ogle .................. B60S 9/06
280/6.153
(Continued)

FOREIGN PATENT DOCUMENTS

CN 102439815 A 5/2012
DE 102010035868 B3 2/2012
(Continued)

OTHER PUBLICATIONS

International Search Report dated Oct. 29, 2013, issued for PCT/JP2013/071064.
(Continued)

Primary Examiner — Yuri Kan
(74) Attorney, Agent, or Firm — Locke Lord LLP

(57) ABSTRACT

A work vehicle which is provided with a battery and at least one motor, the motor being driven by electric power supplied from the battery, the work vehicle including: a charging terminal to which a feed terminal provided in a charging device disposed at an outside of the work vehicle is connected at a time of charging the battery; a communication terminal to which a communication terminal for the charging device to communicate with the work vehicle is connected at the time of charging the battery; and an in-vehicle controller which controls the work vehicle, and controls the charging device through the communication terminal at the time of charging the battery.

4 Claims, 12 Drawing Sheets

(51) Int. Cl.
*B66F 9/06* (2006.01)
*B66F 9/075* (2006.01)
*B66F 9/24* (2006.01)
*H01M 10/613* (2014.01)
*H01M 10/617* (2014.01)
*H01M 10/625* (2014.01)
*H01M 10/63* (2014.01)
*H01M 10/6563* (2014.01)
*H01M 10/06* (2006.01)
*H01M 10/44* (2006.01)
*H01M 10/48* (2006.01)
*H02J 7/00* (2006.01)

(52) U.S. Cl.
CPC ....... *B60L 11/1838* (2013.01); *B60L 11/1872* (2013.01); *B60L 11/1877* (2013.01); *B66F 9/06* (2013.01); *B66F 9/07572* (2013.01); *B66F 9/24* (2013.01); *H01M 10/06* (2013.01); *H01M 10/441* (2013.01); *H01M 10/443* (2013.01); *H01M 10/486* (2013.01); *H01M 10/613* (2015.04); *H01M 10/617* (2015.04); *H01M 10/625* (2015.04); *H01M 10/63* (2015.04); *H01M 10/6563* (2015.04); *H02J 7/007* (2013.01); *B60L 2200/42* (2013.01); *B60L 2240/545* (2013.01); *H01M 2220/20* (2013.01); *H02J 2007/0096* (2013.01); *Y02T 10/7005* (2013.01)

(58) Field of Classification Search
CPC .......... B60S 9/06; H02J 7/0042; G07C 5/085; G07C 5/008; G08B 21/185; B60W 10/26
USPC ......... 701/22, 29.6, 31.5; 439/304; 320/107, 320/109; 280/6.153; 340/426.19; 290/40 F
See application file for complete search history.

(56) References Cited

U.S. PATENT DOCUMENTS

| | | | | |
|---|---|---|---|---|
| 2010/0145568 A1* | 6/2010 | Watanabe | ............ | G07C 5/085 701/29.6 |
| 2011/0169448 A1* | 7/2011 | Ichikawa | ............ | B60K 6/445 320/109 |
| 2011/0287649 A1* | 11/2011 | Kurumizawa | ...... | B60L 11/1818 439/304 |
| 2011/0291612 A1* | 12/2011 | Fujitake | ................ | B60K 6/445 320/107 |
| 2012/0074900 A1 | 3/2012 | Takikita | | |
| 2012/0091954 A1 | 4/2012 | Matsuki | | |
| 2012/0126754 A1 | 5/2012 | Akahane et al. | | |
| 2012/0293114 A1 | 11/2012 | Murochi et al. | | |
| 2013/0099737 A1* | 4/2013 | Douglass | ............. | H02J 7/0042 320/109 |
| 2013/0252458 A1 | 9/2013 | Krome et al. | | |
| 2014/0117677 A1* | 5/2014 | Fukuzawa | ............. | B60W 10/26 290/40 F |
| 2014/0266653 A1* | 9/2014 | Morgan | ............... | G08B 21/185 340/426.19 |
| 2015/0022152 A1* | 1/2015 | Nakagawa | .......... | B60L 11/1838 320/109 |
| 2015/0112541 A1* | 4/2015 | Kakinuma | ............ | G07C 5/008 701/31.5 |
| 2015/0317755 A1* | 11/2015 | Tsuda | ..................... | B60L 8/003 701/31.5 |

FOREIGN PATENT DOCUMENTS

| | | |
|---|---|---|
| DE | 102010042227 A1 | 4/2012 |
| DE | 102011107055 A1 | 11/2012 |
| JP | 2004-032869 A | 1/2004 |
| JP | 2010-239850 A | 10/2010 |
| JP | 2011-142704 A | 7/2011 |
| JP | 2012-070593 A | 4/2012 |
| JP | 2012-228060 A | 11/2012 |
| JP | 2013-027204 A | 2/2013 |
| WO | WO-2012/004848 A1 | 1/2012 |
| WO | WO-2012/070190 A1 | 5/2012 |

OTHER PUBLICATIONS

Office Action dated Jul. 31, 2015, issued for the corresponding German Patent Application No. 112013000094.6 and English translation thereof.

* cited by examiner

WORK VEHICLE

FIELD

The present invention relates to a battery-type work vehicle which includes a battery built therein and runs by a motor driven by electric power supplied from the battery.

BACKGROUND

For example, there is known a work vehicle which includes a running motor built therein and supplies electric power from the battery to the motor for the running. When the electric power charged in the battery is consumed, such a work vehicle needs to be charged using a charging device. For example, Patent Literature 1 discloses a charging system which manages an operator's battery charging operation in a base station provided with the charging device.

CITATION LIST

Patent Literature

Patent Literature 1: Japanese Laid-open Patent Publication No. 2011-142704

SUMMARY

Technical Problem

When a battery built in a work vehicle is charged in a boost mode, the current supplied to the battery increases, and as a result the heat value of the charging device will be larger. Thus, a radiator for releasing heat generated by the charging device needs to increase in size, or the charging device is necessarily cooled down using a fan or the like by force. Therefore, the charging device is likely to increase in size.

An object of the invention is to manage the battery of the battery-type work vehicle while suppressing the vehicle from increasing in size.

Solution to Problem

According to the present invention, a work vehicle which is provided with a battery and at least one motor, the motor being driven by electric power supplied from the battery, the work vehicle comprises: a charging terminal to which a feed terminal provided in a charging device disposed at an outside of the work vehicle is connected at a time of charging the battery; a communication terminal to which a communication terminal for the charging device to communicate with the work vehicle is connected at the time of charging the battery; and an in-vehicle controller which controls the work vehicle, and controls the charging device through the communication terminal at the time of charging the battery.

In the present invention, it is preferable that the work vehicle further comprises a switch which is provided between the charging terminal and a terminal of the battery.

In the present invention, it is preferable that the battery supplies electric power to be consumed by a control unit which is provided in the charging device to control the charging of the battery at the time of charging.

In the present invention, it is preferable that the work vehicle further comprises: a start unit which makes the in-vehicle controller start in response to a signal from the charging device at the time of charging the battery; and a signal terminal which is connected to a terminal to transmit a signal from the charging device at the time of charging the battery.

In the present invention, it is preferable that the charging terminal, the communication terminal, the signal terminal are disposed in a same connector.

In the present invention, it is preferable that the in-vehicle controller, makes the switch enter into a connection state to supply electric power from the battery to the charging device after starting by the start unit, makes the charging device start charging of the battery when a start completion signal is received from the charging device through the communication terminal, and makes the charging device stop charging of the battery when a charge amount of the battery is equal to or more than a predetermined amount.

In the present invention, it is preferable that the in-vehicle controller makes the switch enter into a non-connection state to stop supplying of the electric power to the charging device when a stop signal is received from the charging device.

According to the invention, the battery of the battery-type work vehicle can be managed while suppressing the vehicle from increasing in size.

DESCRIPTION OF EMBODIMENTS

Modes (embodiments) for carrying out the invention will be described in detail with reference to the drawings.

Figure 1:
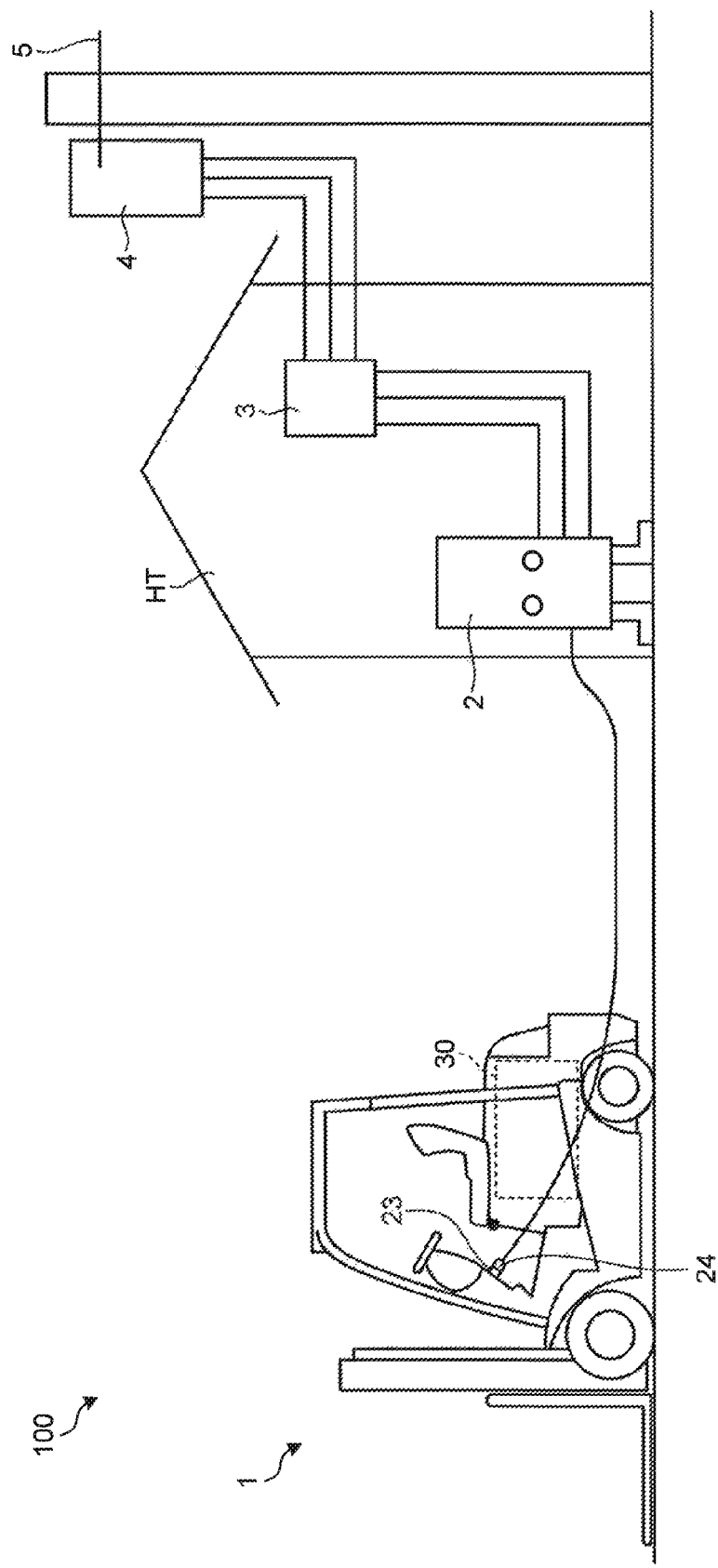
FIG. 1 is a diagram illustrating a work vehicle charging system according to an embodiment.

FIG. 1 is a diagram illustrating a work vehicle charging system according to an embodiment. In the embodiment, a battery-type forklift 1 will be described as an example of a work vehicle, but the work vehicle is not limited thereto. For example, the work vehicle may be a wheel loader or an excavator which is driven by electric power from the battery or electric power obtained from a motor driven by such as an engine.

A work vehicle charging system 100 includes the battery-type forklift 1 and a charging device 2. The battery-type forklift 1 is a battery-type work vehicle which is provided with a battery 30 as a battery for work vehicle and at least one motor driven by electric power supplied from the battery 30. The at least one motor is, for example, a motor which causes the battery-type forklift 1 to run. The charging device 2 is a stationary apparatus which is provided in a building HT or the eaves or the like of the building HT. The charging device 2 is supplied with 3-phase AC power from a power distribution panel 3 in the building HT. The charging device 2 can charge the battery 30 of the battery-type forklift 1 in a boost mode. The power distribution panel 3 is supplied with the AC power from, for example, a pole-mounted transformer 4. The pole-mounted transformer 4 is supplied with the AC power through an electric power line 5 from an electric power substation. For example, a charging connector 23 of the battery-type forklift 1 is connected to a charging device-side connector 24 of the charging device 2 during a rest period for the charging of the battery 30. In a case of using the rest period, the battery 30 may be charged in a boost mode.

Figure 2:
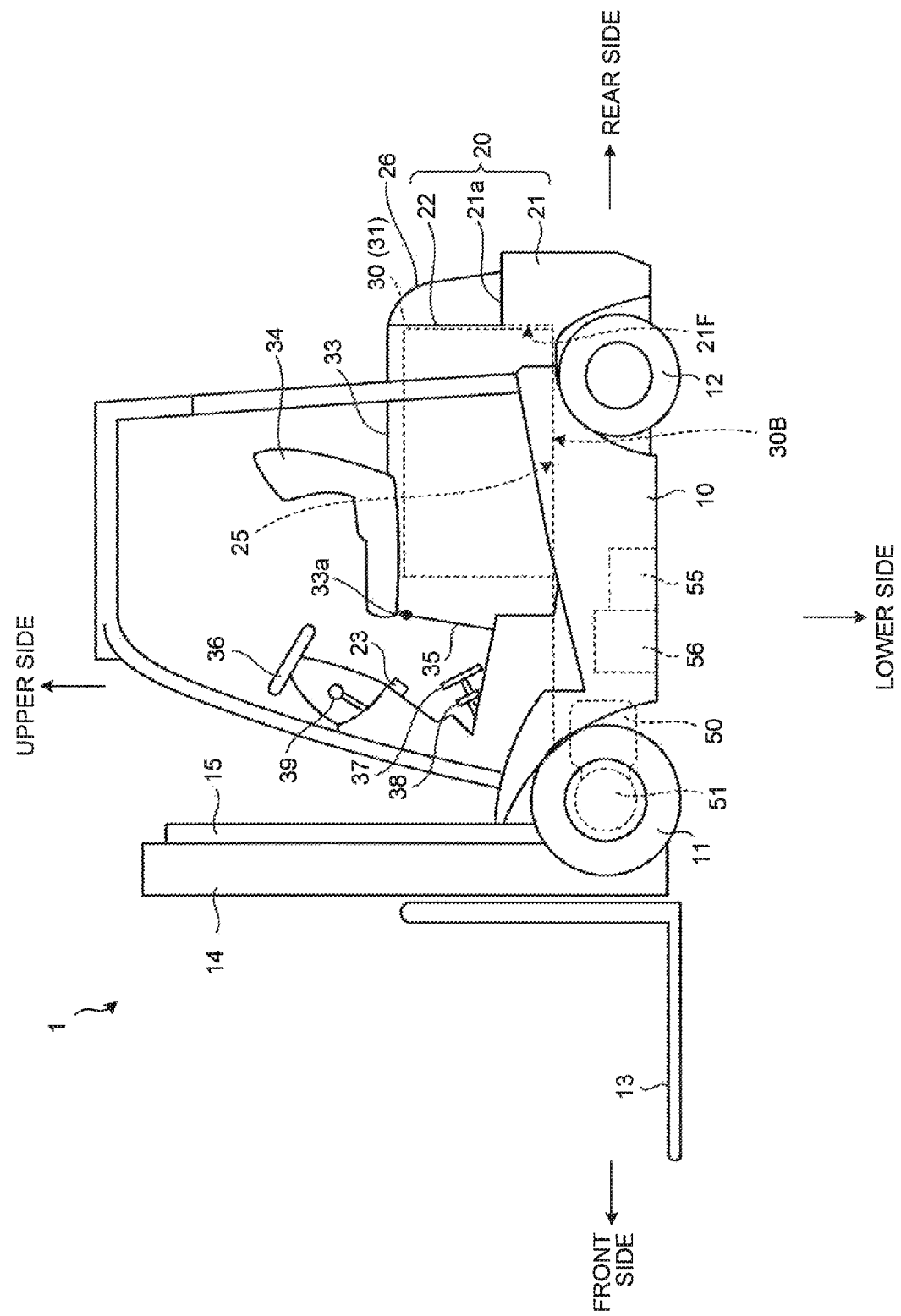
FIG. 2 is a side view illustrating a state of a battery-type forklift according to the embodiment seen from the left side.
Figure 3:
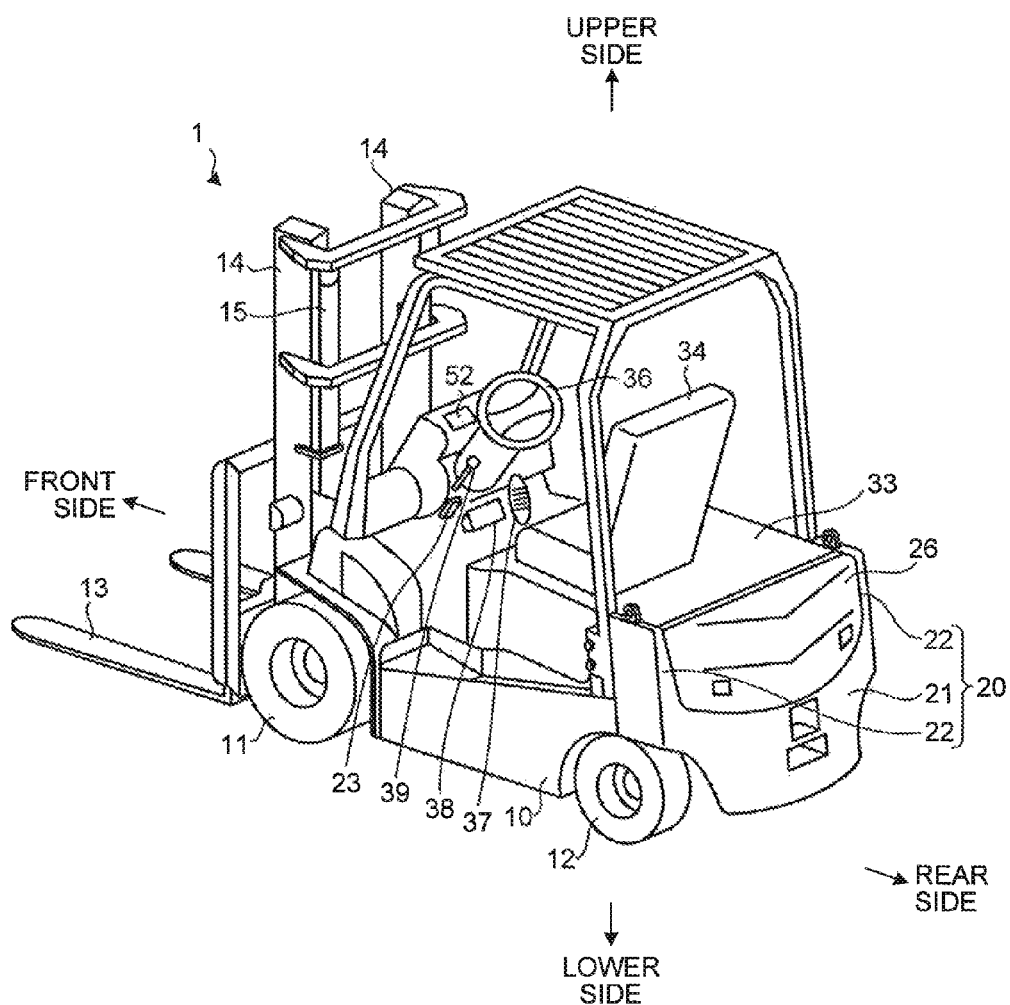
FIG. 3 is a perspective view illustrating a state of the battery-type forklift according to the embodiment obliquely seen from the rear left upper side.

FIG. 2 is a side view illustrating a state of the battery-type forklift according to the embodiment seen from the left side. FIG. 3 is a perspective view illustrating a state of the battery-type forklift according to the embodiment obliquely seen from a left upper side. In the following description, the front of the battery-type forklift 1 is on the side where a fork 13 is provided, and the rear thereof is on the side where a counterweight 20 is provided. When the work vehicle is not the battery-type forklift, the front is on the side facing from a driver seat 34 to a handle 36 as an operating device, and the rear is on the side facing from the handle 36 to the driver seat 34. Besides the handle 36 used for steering the work vehicle, examples of the operating device also include operating levers which are used for operating working machines in the excavator or the wheel loader, or the like.

In the embodiment, a right and left side means a right and left side with respect to the front. A right and left direction means a width direction of a vehicle body 10 as the main body of the work vehicle. An upper side is on the side perpendicular to a plane (ground plane) where at least three of front wheels 11 and rear wheels 12 are brought in contact, facing from the ground plane to a rotation center axis of the front wheels 11 or the rear wheels 12. A lower side is on the side facing from the rotation center axis of the front wheels 11 or the rear wheels 12 to the ground plane. An axis which is arranged along the vehicle body 10 in a front and rear direction and passes through the center of the vehicle body 10 in the width direction will be referred to as a front and rear axis; an axis which is arranged perpendicular to the front and rear axis, parallel to the installation plane, and along the vehicle body 10 in the right and left direction will be referred to as a right and left axis. An axis of the vehicle body 10 in an upper and lower direction will be referred to as an upper and lower axis. The upper and lower axis is perpendicular to both of the front and rear axis and the right and left axis. In the following, it is assumed that the expression "in plan view" refers to a state viewed from the upper side.

<Overall Configuration of Battery-Type Forklift 1>

The battery-type forklift 1 is provided with the front wheel 11 in each of the corner portions of the front of the vehicle body 10, and the rear wheel 12 in each of the corner portion of the rear of the vehicle body 10. A motor for a running operation (a running motor) 50 which is provided in the rear of the front wheels 11 drives the front wheels 11, and thus the battery-type forklift 1 runs. More specifically, the output of the running motor 50 is transferred to both the front wheels 11 and 11 through a power transmission device 51 which has a decelerating function, and thus the front wheels are driven.

In the embodiment, as the running motor 50, there may be used, for example, a PM (Permanent Magnet) motor, that is, a motor having a permanent magnet as a rotor. When the PM motor is used as the running motor 50, it may be in an SPM (Surface Permanent Magnet) type or an IPM (Interior Permanent Magnet) type.

In the front of the vehicle body 10, there is provided a fork 13 which is used for loading/unloading or moving cargoes. The fork 13 is supported to a mast 14 which is provided in the upper and lower direction. The fork 13 moves up and down along the mast 14 while a mast cylinder 15 provided in the mast 14 is driven. While not illustrated in the drawing, the mast 14 is attached to the vehicle body 10 to be rotatably about each axis on the right and left side at the lower end thereof. Further, the mast 14 is provided with a tilt cylinder (not illustrated) between the mast and the vehicle body 10. The mast 14 can be in a forward or backward tilted posture with respect to the vehicle body 10 by driving the tilt cylinder.

At the trailing edge of the vehicle body 10, the counterweight 20 is provided. As described above, the battery-type forklift 1 is a counterbalance forklift, but not limited thereto. The counterweight 20 is a weight for taking a balance in a case where the fork 13 supports a cargo. For example, the counterweight 20 is made of metal, but not limited thereto. The counterweight 20 is disposed on a portion ranging from the top of the rear wheels 12 to the rear edge of the vehicle body 10.

The battery-type forklift 1 is provided with an accelerator pedal 37, a brake pedal 38, and an advancing direction switching lever 39. The accelerator pedal 37 is an operation member to control an output and a rotational direction of the running motor 50. The brake pedal 38 is an operation member to stop the battery-type forklift 1. The advancing direction switching lever 39 is an operation member to switch the advancing direction of the battery-type forklift 1 to any one of the forward direction and the backward direction. The battery-type forklift 1 is provided with the charging connector 23. The charging connector 23 is connected to the charging device-side connector 24 of the charging device 2 illustrated in FIG. 1 while the battery 30 is charged. The charging connector 23 is attached with a cover for preventing water when the charging device-side connector 24 is not connected.

As illustrated in FIG. 3, the battery-type forklift 1 is provided with a display panel 52 as a display device on the front of the handle 36. The display panel 52 includes an input unit through which various settings are made with respect to the battery-type forklift 1, and a display unit on which information on states of the battery-type forklift 1 is displayed. An operator of the battery-type forklift 1 makes various settings with respect to the battery-type forklift 1 through the display panel 52. Examples of the information on the states of the battery-type forklift 1 which is displayed in the display unit of the display panel 52 include the states of the battery 30 or the hydraulic pressures of working fluids supplied to the mast cylinder 15 and the like. The working fluid is supplied from a hydraulic pump 56 which is driven by a cargo-handling motor 55 to be described below.

<Electric System ES of Battery-Type Forklift 1>

Figure 4:
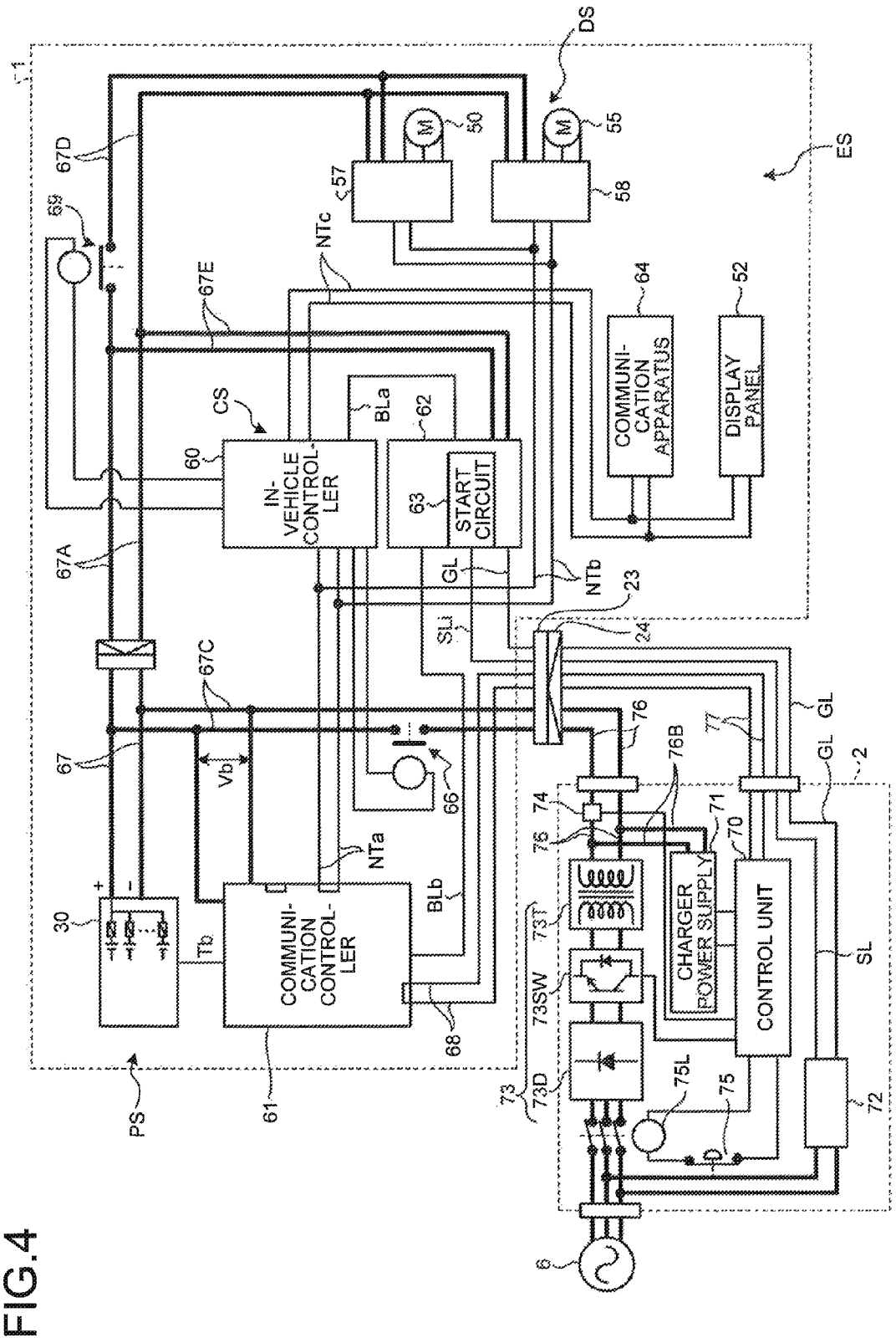
FIG. 4 is a block diagram illustrating an electric system of the battery-type forklift according to the embodiment.

FIG. 4 is a block diagram illustrating an electric system of the battery-type forklift according to the embodiment. The electric system ES of the battery-type forklift 1 includes a control system CS, a power supply system PS, and a driving system DS. The control system. CS is configured by machinery for controlling the battery-type forklift 1. The control system CS includes an in-vehicle controller 60, a communication controller 61, a communication apparatus 64, and a display panel 52. The in-vehicle controller 60 is called a master controller; for example, a computer may be used. The in-vehicle controller 60 controls a running motor 50 and a cargo-handling motor 55 which are provided in the battery-type forklift 1. Specifically, the in-vehicle controller 60 controls the running motor 50 through a running inverter 57, and the cargo-handling motor 55 through a cargo-handling inverter 58. Besides, the in-vehicle controller 60 controls a displaying operation of the display panel 52, a communication operation between the communication apparatus 64 and the maintenance center, and a monitoring operation of the states of the battery 30. In this way, the in-vehicle controller 60 performs the overall control on the battery-type forklift 1.

The communication controller 61 mainly serves as an interface which relays the communication between the in-vehicle controller 60 and the charging device 2 provided on the outside of the battery-type forklift 1. In the communication controller 61, communication lines 68 are connected for the communication with the charging device 2. Besides, the communication controller 61 detects a temperature Tb of the battery 30 and a voltage Vb between the terminals and transmits the detected values to the in-vehicle controller 60. The communication apparatus 64 is an apparatus for making a wireless communication with the outside of the battery-type forklift 1, for example, a maintenance center and the like. The display panel 52 is controlled by the in-vehicle controller 60, and displays information about the states of the battery-type forklift 1, for example, a pressure of working oil, a remaining level of the battery 30 and the like. As described above, the display panel 52 includes the input unit. An operator of the battery-type forklift 1 can perform a predetermined function of the battery-type forklift 1 using the display panel 52. In the embodiment, the operator can perform control on the charging device 2, which is included in the in-vehicle controller 60, through the display panel 52.

The in-vehicle controller 60 is connected to the communication controller 61, the communication apparatus 64, and the display panel 52 through communication lines NTa and NTc. The in-vehicle controller 60 exchanges information with the communication controller 61, the communication apparatus 64, and the display panel 52 through the communication lines NTa and NTc. Further, the in-vehicle controller 60 is connected to the running inverter 57 and the cargo-handling inverter 58 through the communication lines NTa and NTb. The in-vehicle controller 60 controls the running inverter 57 and the cargo-handling inverter 58 through the communication lines NTa and NTb, thereby controlling the operations of the running motor 50 and the cargo-handling motor 55. In addition, the in-vehicle controller 60 controls the charging device 2 at the time of charging the battery 30.

The power supply system PS supplies electric power for the battery-type forklift 1. The power supply system PS includes the battery 30 and a power supply 62. The battery 30 is a DC power supply for supplying DC power. The battery 30 supplies electric power to the power-consuming machinery through power lines 67. Further, the battery 30 is charged by the charging device 2 through the power lines 67. The voltage Vb between the terminals descried above is a voltage applied between the power lines 67. The power supply 62 is supplied with the electric power from the battery 30 through power lines 67, 67A, and 67E, transforms the supplied voltage (making the voltage down in this embodiment), and then supplies it to the in-vehicle controller 60 and the communication controller 61 through lines BLa and BLb. The power supply 62, for example, is a DC-DC converter. The power supply 62 includes a start circuit 63. Further, the power supply 62 is connected with an in-vehicle signal line SLi and a ground line GL. The in-vehicle signal line SLi is a signal line for transmitting a signal from the charging device 2 to the start circuit 63.

Charging power lines 67C are branched off from the power lines 67 of the battery 30 to supply the charging power to the battery 30 from the charging device 2. The charging power lines 67C include a contactor 66 as a switch in the middle thereof. The contactor 66 is provided between the terminal of the battery 30 and a charging terminal included in the charging connector 23. The contactor 66 is controlled by the in-vehicle controller 60. When the battery 30 is supplied with the charging power, the contactor 66 comes to be a connection state (a closed state or an ON state) by the in-vehicle controller 60. When the battery 30 is not supplied with the charging power, the contactor 66 comes to be a non-connection state (an open state or an OFF state) by the in-vehicle controller 60.

The driving system DS makes the battery-type forklift 1 run, or drives the hydraulic pump 56 to make the fork 13 move up and down. The driving system DS includes the running inverter 57, the cargo-handling inverter 58, the running motor 50, and the cargo-handling motor 55. The running inverter 57 and the cargo-handling inverter 58 are supplied with the electric power from the battery 30 through power lines 67, 67A, and 67D. The power lines 670 is provided with a contactor 69 as a switch. The contactor 69 is controlled by the in-vehicle controller 60. When the battery-type forklift 1 is being moved, the contactor 69 comes to be a connection state, and the electric power is supplied from the battery 30 to the running inverter 57 and the cargo-handling inverter 58. When the battery-type forklift 1 is being stopped, for example, when the battery 30 is being charged, the contactor 69 comes to be a non-connection state.

The charging power lines 67C, the communication lines 68, the in-vehicle signal line STA and the ground line GL are arranged in one charging connector 23 which is connected to the charging device-side connector 24 of the charging device 2. Next, the charging device 2 will be described.

<Electric System of Charging Device 2>

The charging device 2 includes a control unit 70, a charger power supply 71, a start signal generating unit 72, and a power conversion unit 73. The charging device 2 can make a communication with the battery-type forklift 1. The control unit 70, for example, is a computer which controls the charging operation of the battery 30 on the basis of a command signal from the in-vehicle controller 60 of the battery-type forklift 1. For example, the control unit 70 controls the current or voltage of the DC power to be supplied to the battery 30 on the basis of a command signal from the in-vehicle controller 60 for charging the battery 30. The command signal from the in-vehicle controller 60 for charging the battery 30 is input to the control unit 70 through communication lines 77. The charger power supply 71 transforms the power supplied from the battery 30 which is built in the battery-type forklift 1 (making the voltage down in this embodiment), and supplies it to the control unit 70. The charger power supply 71 is supplied with the power from power lines 76B which are branched off from power supply lines 76 and power lines 76B which are branched off from the power supply lines 76. The control unit 70 operates by the power supplied from the charger power supply 71. In the embodiment, the charger power supply 71, for example, is a DC-DC converter.

The start signal generating unit 72 generates a signal (hereinafter, appropriately referred to as a start signal) to start the in-vehicle controller 60, and transmits the signal to the power supply 62 of the battery-type forklift 1 through signal lines SL. The start signal generating unit 72 is connected to an AC power supply 6 which is a three-phase AC power supply. The start signal generating unit 72 outputs a predetermined amplitude of DC voltage as long as a single-phase AC power is applied from the AC power supply 6. In other words, the start signal generating unit 72 is an AC-DC converter.

The power conversion unit 73 is provided with diodes 73D, switching elements 73SW, and a rectifying unit 73T. The diodes 73D rectify the three-phase AC power from the AC power supply 6. The switching elements 73SW are turned ON/OFF at predetermined timing by the control unit 70, and thus are controlled to make a current constant by causing the charging device 2 to output a constant value of current. The rectifying unit 73T is provided with a transformer, which transforms the current output by the switching elements 73SW (making the voltage down in this embodiment) and outputs the transformed current. The DC power output by the charging device 2 is output through the power supply lines 76. The power supply lines 76 are attached with a sensor 74 to detect the current and voltage. The control unit 70 controls the operations of the switching elements 73SW on the basis of at least one of the current value and voltage value detected by the sensor 74, so that at least one of the current and voltage of the DC power output by the charging device becomes a predetermined value which is indicated from the in-vehicle controller 60.

The control unit 70 is connected with an emergency stop switch 75 and a coil 75L. When the emergency stop switch 75 is operated, the control unit 70 stops the charging operation. In the embodiment, the power supply lines 76, the communication lines 77, the signal lines SL, and the ground line GL described above are arranged in one charging connector 23, and connected to the charging device-side connector 24 of the charging device 2.

At the time of charging the battery 30, the charging device-side connector 24 and the charging connector 23 are connected. When both connectors are connected, the power supply lines 76, the communication lines 77, the signal lines SL, and the ground line GL disposed on the charging device 2 are electrically connected to the charging power lines 67C, the communication lines 68, the in-vehicle signal line SLi, and the ground line GL disposed on the battery-type forklift in this order. Through the electrical connection between the power supply lines 76 on the charging device 2 and the charging power lines 67C on the battery-type forklift, the electric power from the charging device 2 is supplied to the battery 30. Further, the electric power from the battery 30 is supplied to the charger power supply 71 through the charging power lines 67C, the power supply lines 76, and the power lines 76B branched off from the power supply lines 76. In this way, at the time of charging, the electric power is supplied from the battery 30, and thus the control unit 70 comes to operate.

Through the electrical connection between the communication lines 77 on the charging device 2 and the communication lines 68 on the battery-type forklift, the in-vehicle controller 60 of the battery-type forklift 1 can make control on the control unit 70 of the charging device 2 through the communication controller 61. Further, the control unit 70 of the charging device 2 can also transmit information to the in-vehicle controller 60 through the communication controller 61 of the battery-type forklift 1. When the signal lines SL from the start signal generating unit 72 of the charging device 2 and the in-vehicle signal line SLi of the battery-type forklift 1 are connected, and the ground line GL of the charging device 2 and the ground line GL of the battery-type forklift 1 are connected, a start signal is input to the start circuit 63 of the power supply 62 of the battery-type forklift 1. Then, the start circuit 63 causes the power supply 62 to supply the electric power to the in-vehicle controller 60 and the communication controller 61 for making these controllers start.

<Structure of Battery 30>

Figure 5:
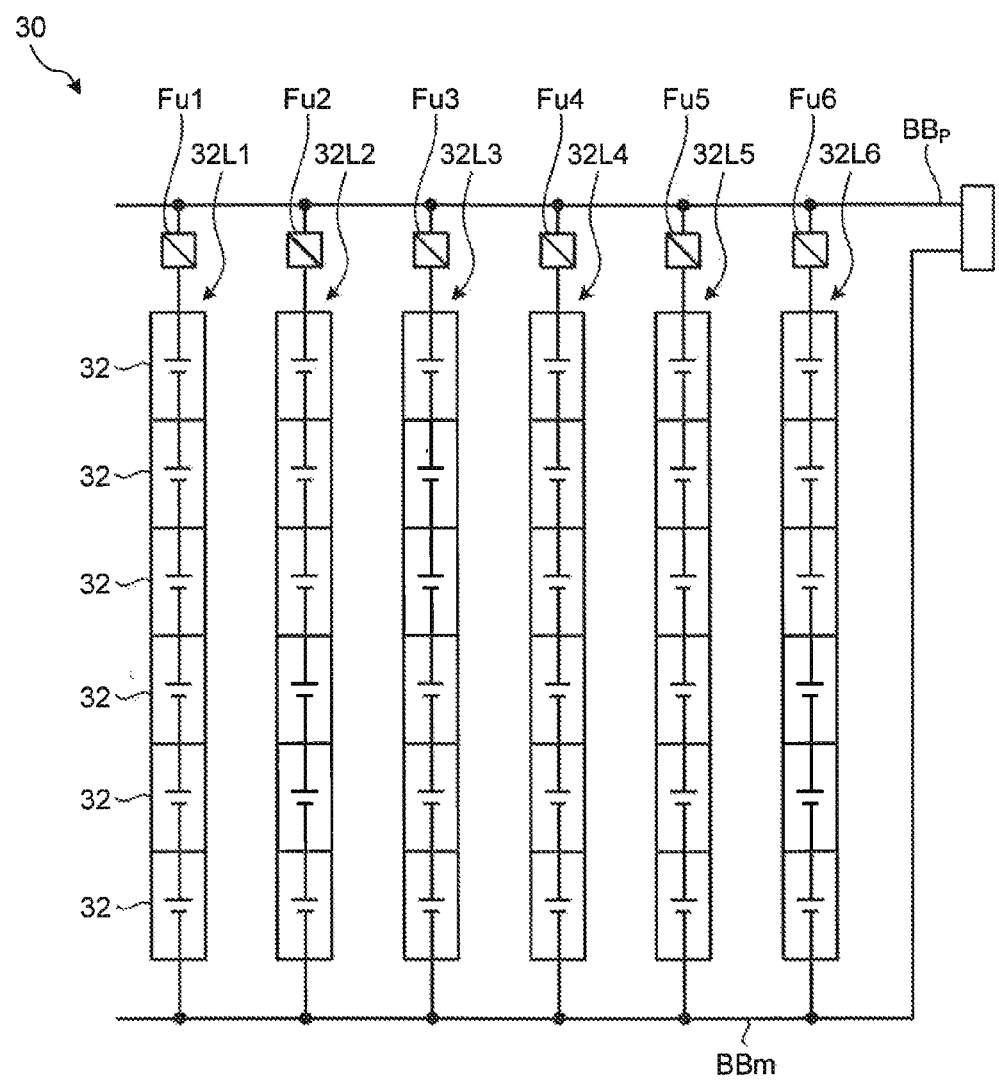
FIG. 5 is an explanatory diagram illustrating a battery which is provided in the battery-type forklift according to the embodiment.

FIG. 5 is an explanatory diagram illustrating a battery which is provided in the battery-type forklift according to the embodiment. The battery 30 is provided with a plurality of battery cells 32. In the embodiment, the battery cell 32 is a control valve type battery (for example, a lead battery). Such a battery cell 32 is suitable for a boost charge. Each battery cell 32 has a voltage of 12 V between the terminals. In the embodiment, the plurality (6 in this case) of battery cells 32 are connected in series to form battery cell groups 32L1, 32L2, 32L3, 32L4, 32L5, and 32L6. Then, the respective battery cell groups 32L1, 32L2, 32L3, 32L4, 32L5, and 32L6, are connected in parallel using, for example, copper bus-bars BBp and BBm. In this way, the battery 30 is a parallel battery pack which is configured by the plurality of battery cell groups 32L1, 32L2, 32L3, 32L4, 32L5, and 32L6 connected in parallel.

The bus-bar BBm electrically connects the negative electrode terminals of the respective battery cell groups 32L1, 32L2, 32L3, 32L4, 32L5, and 32L6, the bus-bar BBp electrically connects the positive electrode terminals of the respective battery cell groups 32L1, 32L2, 32L3, 32L4, 32L5, and 32L6. Between the bus-bar BBp and the respective battery cell groups 32L1, 32L2, 32L3, 32L4, 32L5, and 32L6, there are fuses Fu1, Fu2, Fu3, Fu4, Fu5, and Fu6 connected therebetween.

Since the battery 30 is configured as a parallel battery pack, when the variation in temperatures of the respective battery cell groups 32L1, 32L2, 32L3, 32L4, 32L5, and 32L6 occurs, the internal resistance of the high-temperature battery cell 32 is lowered and the current will easily flow. As a result, there may cause a variation in the charging rates of the respective battery cell groups 32L1, 32L2, 32L3, 32L4, 32L5, and 32L6 or a decrease in durability of the battery cell 32. In general, the variation of the charging rates and the decrease in durability are suppressed by controlling the current flowing in the respective battery cell groups 32L1, 32L2, 32L3, 32L4, 32L5, and 32L6 at the time of charging.

In the embodiment, the respective battery cell groups 32L1, 32L2, 32L3, 32L4, 32L5, and 32L6 are disposed such that total lengths from the bus-bar BBp to the bus-bar BBm are equal. In this way, since the variation in resistance of the respective battery cell, groups 32L1, 32L2, 32L3, 32L4, 32L5, and 32L6 can be suppressed, the variation in temperatures of the respective battery cell groups 32L1, 32L2, 32L3, 32L4, 32L5, and 32L6 can be suppressed. As a result, even though the in-vehicle controller 60 provided in the battery-type forklift 1 does not individually control the currents flowing into the respective battery cell groups 32L1, 32L2, 32L3, 32L4, 32L5, and 32L6 at the time of charging of the battery 30, the variation in the charging rate can be suppressed.

When the battery 30 is charged, the in-vehicle controller 60 controls the control unit 70 of the charging device 2 through the communication controller 61, the communication lines 68, and the communication lines 77. The control unit 70 operates according to a command of the in-vehicle controller 60. When the battery 30 is charged, the in-vehicle controller 60 controls the control unit 70 of the charging device 2 on the basis of the temperature Tb of the battery 30 detected by the communication controller 61. For example, when the temperature of the battery 30 increases, the internal resistance of the battery cell 32 is lowered, and as a result a large volume of the current will flow into the battery 30. In the embodiment, the battery 30 is charged with a constant current. For this reason, the in-vehicle controller 60 changes a charging current command value on the basis of the temperature Tb of the battery 30. For example, the in vehicle controller 60 makes the charging current command value lowered when the temperature Tb of the battery 30 becomes high, and the charging current command value heightened when the temperature Tb of the battery 30 becomes low. In this way, since the in-vehicle controller 60 controls the charging of the battery 30 on the basis of the temperature Tb of the battery 30, there is no need to individually control the current flowing into the respective battery cell group 32L1, 32L2, 32L3, 32L4, 32L5, and 32L6. Therefore, it is possible to make the control of the in-vehicle controller 60 simple at the time of charging. When the battery 30 is charged in a boost mode, the temperature of the battery cell 32 easily increases, so that the above-mentioned control of the in-vehicle controller 60 is effectively performed.

<Charging Device-Side Connector 24 and Charging Connector 23>

Figure 6:
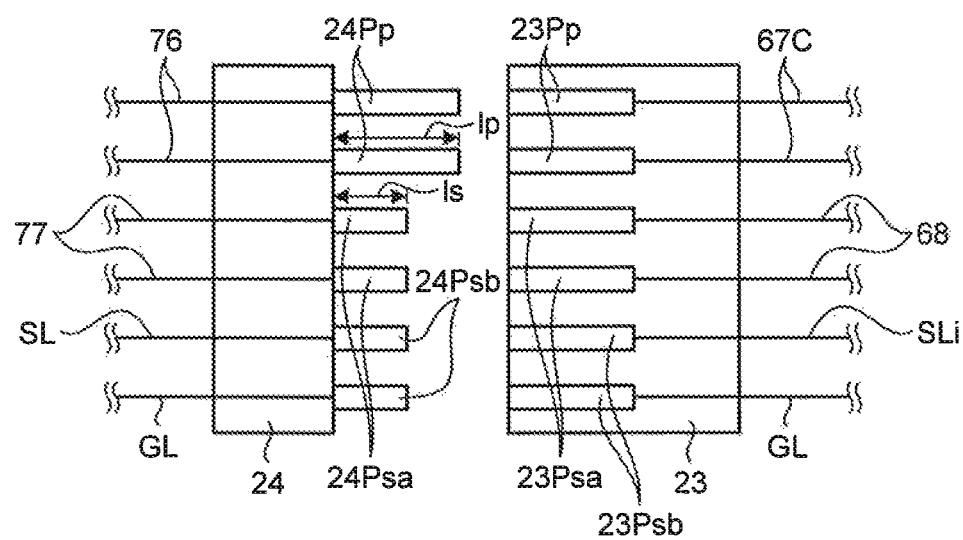
FIG. 6 is a diagram illustrating a charging device-side connector and a charging connector.

FIG. 6 is a diagram illustrating the charging device-side connector and the charging connector. The charging device-side connector 24 is provided with feed terminals 24Pp connected to the power supply lines 76 on the charging device 2, communication terminals 24Psa connected to the communication lines 77 on the charging device 2, and start terminals 24Psb connected to the signal lines SL and the around line GL. The feed terminals 24Pp are terminals for the supply of the DC power output by the power conversion unit 73 to the battery 30. The communication terminals 24Psa are terminals for the communication with the battery-type forklift 1, more specifically the in-vehicle controller 60. The start terminals 21Psb are terminals for the transmission of the start signal to the start circuit 63 of the power supply 62 to make the in-vehicle controller 60 start.

The charging connector 23 is provided with charging terminals 23P$p$ connected to the charging power lines 67C on the battery-type forklift 1, communication terminals 23Psa connected to the communication lines 68 on the battery-type forklift 1, and signal terminals 23Psb connected to the in-vehicle signal line SLi and the ground line GL on the battery-type forklift 1. The charging terminals 23P$p$ are terminals to which the feed terminals 24Pp provided in the charging device 2 are connected at the time of charging the battery 30. The communication terminals 23Psa are terminals to which the communication terminals 24Psa used for the communication between the charging device 2 and the battery-type forklift 1 are connected at the time of charging the battery 30. The signal terminals 23Psb are terminals to which the terminals for the transmission of the signal (specifically, the start signal) from the charging device 2 are connected at the time of charging the battery 30; that is, the start terminals 24Psb of the charging device 2 are connected. The charging terminals 23Pp, the communication terminals 23Psa, and the signal terminals 23Psb are disposed in the same connector, that is, the charging connector 23. Therefore, since there is no need to use a plurality of connectors, a working process is simplified at the time of charging.

The feed terminals 24Pp of the charging device-side connector 24 is connected to the charging terminals 23Pp of the charging connector 23; the communication terminals 24Psa of the charging device-side connector 24 is connected to the communication terminals 23Psa of the charging connector 23; and the start terminals 24Psb of the charging device-side connector 24 is connected to the signal terminals 23Psb of the charging connector 23. The length lp of the feed terminals 24Pp provided in the charging device-side connector 24 is longer than the length is of the communication terminals 24Psa and the start terminals 24Psb. With such a configuration, when the charging device-side connector 24 and the charging connector 23 are connected, the feed terminals 24Pp and the charging terminals 23Pp are first connected, and then the communication terminals 23Psa, the communication terminals 24Psa, the signal terminals 23Psb, and the start terminals 24Psb are connected. The feed terminals 24Pp, the communication terminals 24Psa, and the start terminals 24Psb are disposed in the same connector, that is, the charging device-side connector 24. Therefore, since there is no need to use a plurality of connectors, a working process is simplified at the time of charging.

The control unit 70 of the charging device 2 will operate for the first time when the communication terminals 23Psa and the communication terminals 24Psa are connected and the communication with the in-vehicle controller 60 of the battery-type forklift 1 is established. For this reason, since the control unit 70 does not operate before the communication terminals 23Psa and the communication terminals 24Psa are connected, the charging device 2 does not output the electric power from the power supply lines 76. In a case where the charging device-side connector 24 is incompletely fitted to the charging connector 23 and thus the connection between the communication terminals 23Psa and the communication terminals 24Psa is not made sufficiently, the charging device 2 does not output the electric power through the power supply lines 76, thereby securing safety sufficiently. Further, even in a case where the charging device-side connector 24 is incompletely fitted to the charging connector 23 during the charging, when the connection between the communication terminals 23Psa and the communication terminals 24Psa are not made sufficiently, the charging device 2 does not output the electric power through the power supply lines 76, thereby securing safety sufficiently at the time of charging. From this point of view, it is preferable that the length is of the communication terminals 24Psa be long enough to release the connection between the communication terminals 23Psa and the communication terminals 24Psa when there is a gap between the charging device-side connector 24 and the charging connector 23. Therefore, it is possible to secure safety sufficiently further more at the time of charging.

In the embodiment, the in-vehicle controller 60 built in the battery-type forklift 1 controls the control unit 70 of the charging device 2 provided on the outside of the battery-type forklift 1 through the communication controller 61, the communication lines 68, and the communication lines 77. That is, in the embodiment, the charging device 2 capable of performing the boost charge is a stationary type, and the control apparatus performing charge control is an in-vehicle type. In this way, when the connection of the communication terminals 24Psa and the communication terminals 23Psa which are used for connecting the communication lines 68 and the communication lines 77 between the inside and the outside of the battery-type forklift 1 are released from the connection, the control unit 70 of the charging device 2 stops its operations. As a result, the charging device 2 stops the output of the electric power through the power supply lines 76, so that the sufficient safety can be secured.

<Operations of In-Vehicle Controller and Charging Device at the Time of Charging>

Figure 7:
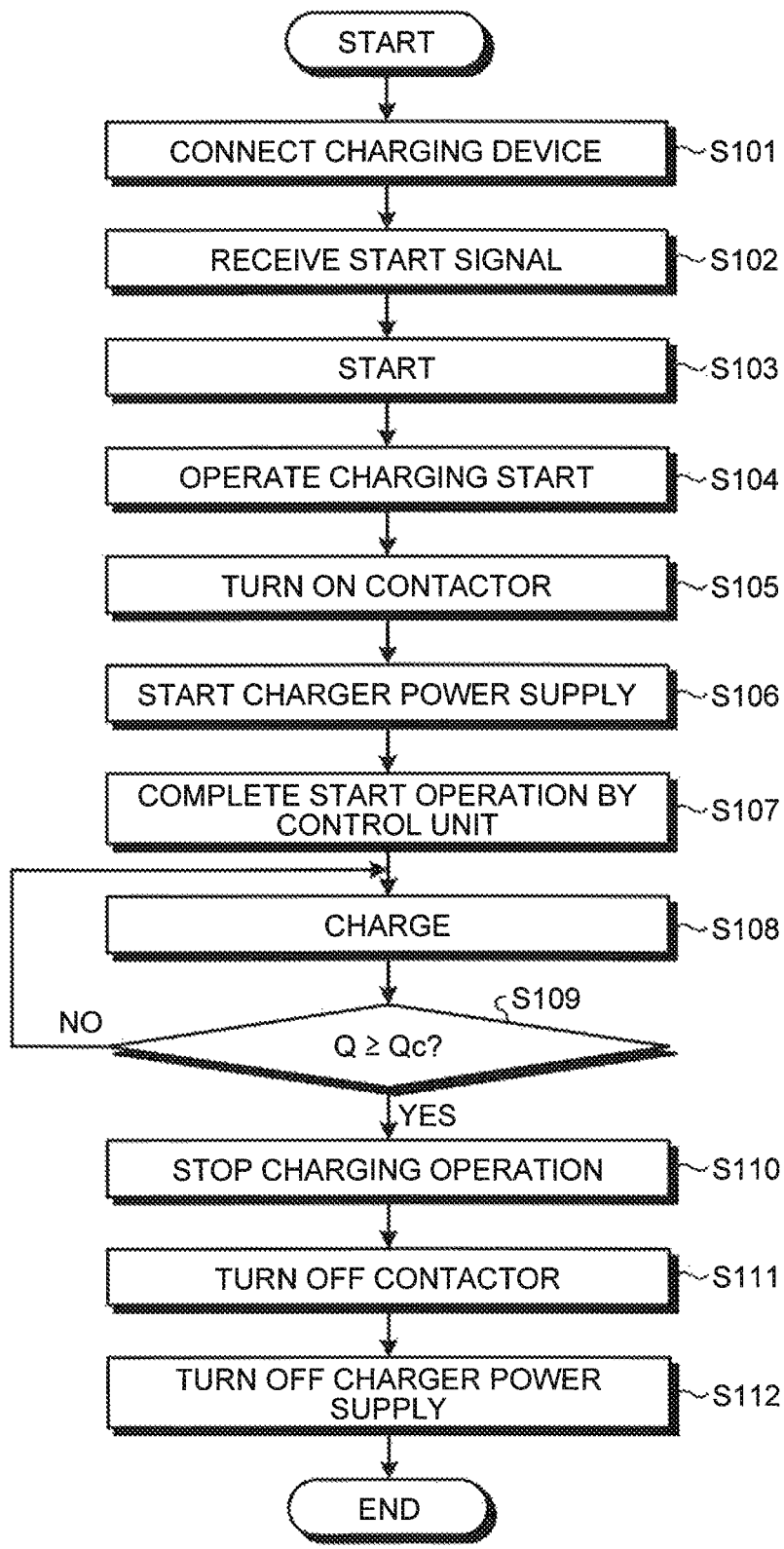
FIG. 7 is a flowchart illustrating an operational example of an in-vehicle controller and a charging device when the battery is charged.

FIG. 7 is a flowchart illustrating an example of the operations of the in-vehicle controller and the charging device at the time of charging the battery. When the battery 30 built in the battery-type forklift 1 is charged, in step S101, an operator of the battery-type forklift 1 or the like connects the charging device-side connector 24 of the charging device 2 to the charging connector 23 of the battery-type forklift 1. Then, the start terminals 24Psb of the charging device-side connector 24 and the signal terminals 23Psb of the charging connector 23 are connected to each other, and thus the start signal is transmitted from the start signal generating unit 72 to the start circuit 63 of the power supply 62. In step S102, when the start circuit 63 receives the start signal, the power supply 62 supplies the electric power to the in-vehicle controller 60 and the communication controller 61. Then, in step S103, the in-vehicle controller 60 and the communication controller 61 start.

When the procedure proceeds to step S104, the operator or the like, for example, performs a charging start operation using the display panel 52. Then, in step S105, the in-vehicle controller 60 causes the contactor 66 provided in the charging power lines 67C to be turned. ON, that is, coming to be the connection state. At this time, the contactor 69 is turned OFF, that is, coming to be the non-connection state. Then, the battery 30 is connected to the power conversion unit 73 of the charging device 2 through the power lines 67, the charging power lines 67C, the charging terminals 23Pp of the charring connector 23, the feed terminals 24Pp of the charging device-side connector 24, and the power supply lines 76. In step S106, the charger power supply 71 of the charging device 2 starts and begins the supply of the electric power to the control unit 70. In step S107, the control unit 70 is supplied with the electric power from the charger power supply 71 to start. When the start is completed, the control unit 70 transmits a start completion signal to the in-vehicle controller 60 through the communication controller 61.

When the in-vehicle controller 60 receives the start completion signal form the control unit 70 of the charging device 2, the charging starts in step S108. Specifically, the in-vehicle controller 60 transmits the charging current command value to the control unit 70 of the charging device 2. The control unit 70 drives the power conversion unit 73, more specifically the switching elements 73SW, on the basis of a charging current command value transmitted from the in-vehicle controller 60. As a result, the power conversion unit 73 supplies the DC power corresponding to the charging current command value to the battery 30. In step S109, the charge amount Q of the battery 30 and a predetermined charge amount Qc are compared. When Q<Qc is satisfied (No in step S109), the in-vehicle controller 60 keeps on charging the battery 30 by the charging device 2.

When Q≥Qc is satisfied (Yes in step S109), in step S110, the in-vehicle controller 60 stops the charging of the battery 30 by the charging device 2. For example, the in-vehicle controller 60 transmits a command value to make the current zero (0) to the control unit 70 of the charging device 2, thereby stopping the charging of the battery 30. The control unit 70 of the charging device 2 transmits a signal (a stop signal) indicating the stop of the charging device 2 to the in-vehicle controller 60. When receiving the stop signal, the in-vehicle controller 60 turns OFF the contactor 66 in step S111, that is, coming to be the non-connection state. At this time, the contactor 69 is turned OFF, that is, coming to be the non-connection state. As a result, in step S112, since the electric power is not supplied from the battery 30 to the charger power supply 71, the charger power supply 71 is turned OFF. Through such a procedure, the charging of the battery 30 is completed.

<Battery 30 and Battery Casing 31>

Figure 8:
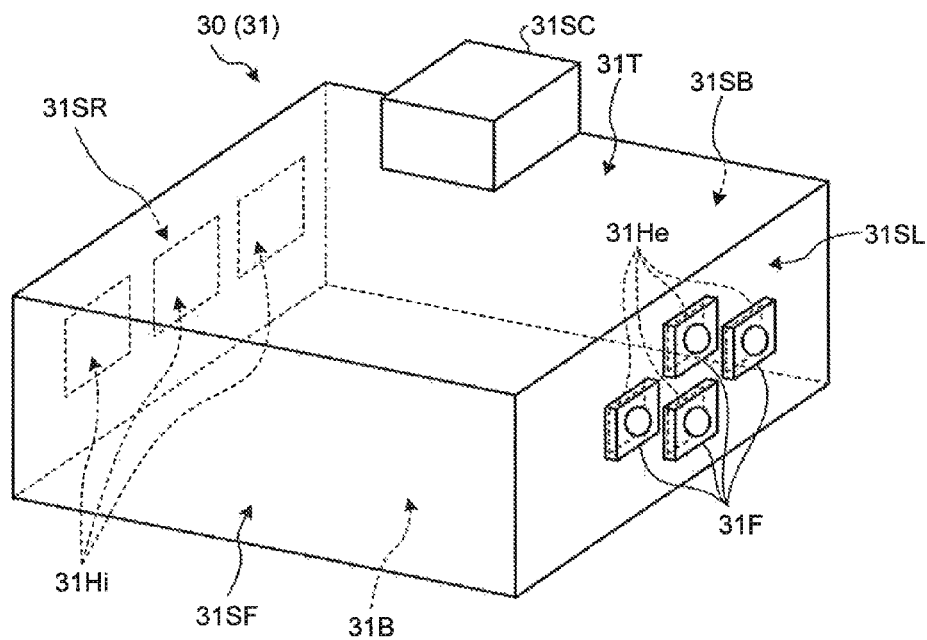
FIG. 8 is a perspective view illustrating the battery and a battery casing according to the embodiment.
Figure 9:
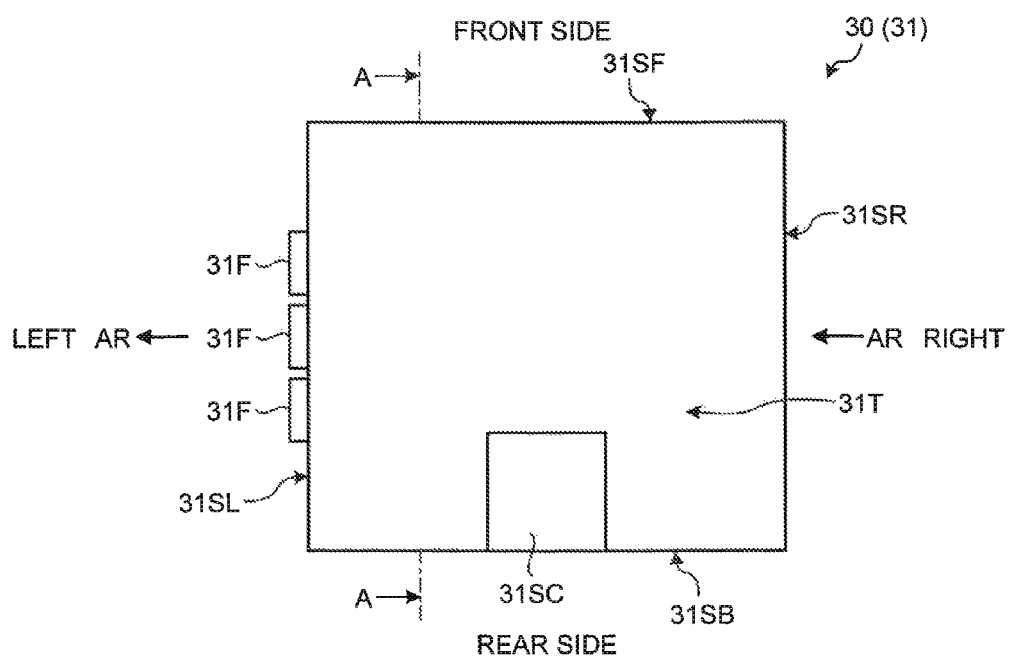
FIG. 9 is a plan view illustrating the battery and the battery casing according to the embodiment.
Figure 10:
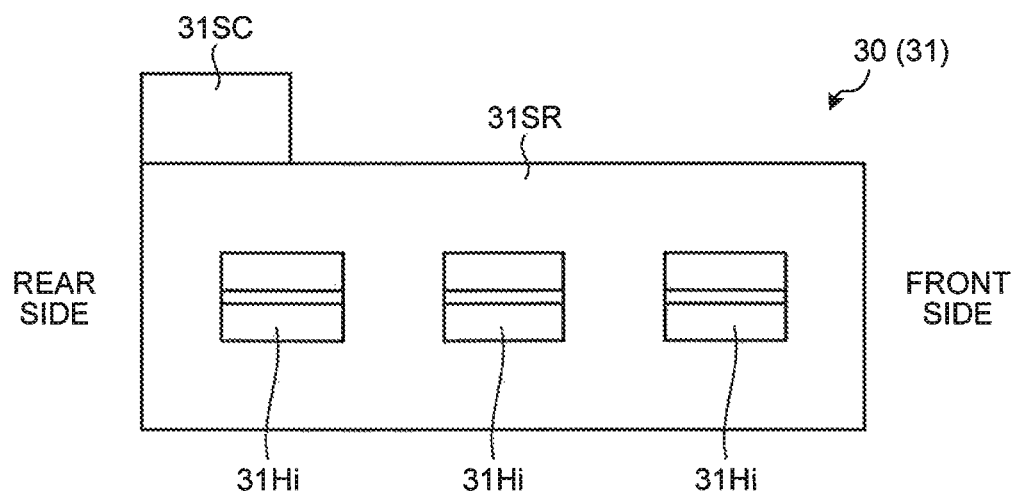
FIG. 10 is a right side view illustrating the battery and the battery casing according to the embodiment.
Figure 11:
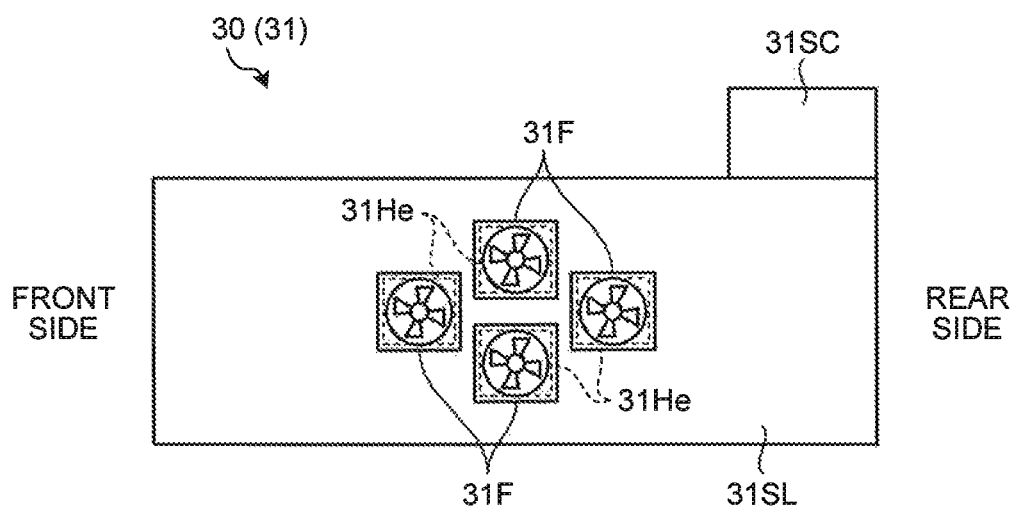
FIG. 11 is a left side view illustrating the battery and the battery casing according to the embodiment.

FIG. 8 is a perspective view illustrating the battery and the battery casing according to the embodiment. FIG. 9 is a plan view illustrating the battery and the battery casing according to the embodiment. FIG. 10 is a right side view illustrating the battery and the battery casing according to the embodiment. FIG. 11 is a left side view illustrating the battery and the battery casing according to the embodiment. The battery 30 is configured of the plurality of battery cells 32 which are stored in a battery casing 31. The battery casing 31 includes a bottom 31B, a top 31T facing the bottom 31B, and sides 31SF, 31SB, 31SL, and 31SR which connect the bottom 31B and the top 31T. The battery casing 31 stores the plurality of battery cells 32 in a space surrounded by the top 31T, the bottom 31B, and the sides 31SF, 31SB, 31SL, and 31SR such that at least some of the plurality of battery cells are caused to come into contact with each other on at least one side.

On the top 31T of the battery casing 31, a storage casing 31SC is attached for storing a protection circuit. In the storage casing 31SC, the above-mentioned fuses Fu1, Fu2, Fu3, Fu4, Fu5, and Fu6, and the contactor 66 are stored. The battery casing 31 is a cuboid structure as illustrated in FIG. 8. The top 31T, the bottom 31B, and the sides 31SF, 31SF, 31SL, and 31SR all are plate-shaped, rectangular (including square) members.

FIG. 9 illustrates a state of the battery 30 which is built in the battery-type forklift 1. As illustrated in FIG. 9, the battery 30 is disposed such that the side 31SF of the battery casing 31 faces the front and the side 31SB of the battery casing 31 faces the rear. Further, the battery 30 is disposed such that the side 31SL of the battery casing 31 faces the left side and the side 31SR of the battery casing 31 faces the right side. The front and the rear correspond to the front and the rear of the battery-type forklift 1 illustrated in FIGS. 2 and 3. In other words, when being built in the battery-type forklift 1, the battery 30 is disposed such that, the side 31SF faces the front and the side 31SB faces the rear.

As illustrated in FIGS. 8 and 10, the side 31SR on the right side among the four sides 31SF, 31SB, 31SL, and 31SR includes inlet holes 31Hi through which the side itself is opened. The inlet holes 31Hi introduce gas into the battery casing 31. In the embodiment, the gas is the air. In the embodiment, the side 31SR has been described to have a plurality (three in the example) of inlet holes 31Hi, but the number of inlet holes is not limited thereto. As illustrated in FIGS. 8 and 11, the side facing the side 31SR opened through the inlet holes 31Hi among the four sides 31SR, 31SB, 31SL, and 31SR, that is, the side 31SL on the left side, includes outlet holes 31He through which the side itself is opened. The outlet holes 31He discharge the gas which has been introduced into the battery casing 31. In the embodiment, the side 31SL has been described to have the plurality (four in the example) of outlet holes 31He, but the number of outlet holes 31He is not limited thereto.

The battery casing 31 includes fans 31F. The fans 31F introduce the gas into the battery casing 31 through the inlet holes 31Hi to make the gas brought into contact with the upper and lower surfaces of the plurality of battery cells 32, and then discharges the gas from the inside of the battery casing 31. In the embodiment, the battery casing 31 has been described to have the plurality (four in the example) of fans 31F. However, the number of fans 31F is not limited to four. The respective fans 31F are attached to the outlet holes 31He. With the structure, the plurality of fans 31F suck the gas from the inside of the battery casing 31 and discharges it to the outside. Since the fans 31F suck the gas from the inside of the battery casing 31, a stable flow of the gas from the inlet holes 31Hi toward the outlet holes 31He can be made in the battery casing 31.

When the plurality of fans 31F discharges the gas from the inside of the battery casing 31, the pressure in the battery casing 31 will be lowered in comparison with the outside. For this reason, the gas is introduced through the inlet holes 31Hi to the inside of the battery casing 31. In the embodiment, as illustrated with arrow AR of FIG. 9, the gas is introduced from the right side of the battery casing 31 to the inside, and then discharged to the left side. In this way, the plurality of battery cells 32 stored in the battery casing 31 are cooled.

In consideration of the relation with the vehicle body 10 of the battery-type forklift 1 illustrated in FIG. 2, the inlet holes 31Hi are disposed on one side in the width direction of the battery-type forklift 1, and the outlet holes 31He are disposed on the other side in the width direction. In the embodiment, the inlet holes 31Hi are disposed on the right side of the vehicle body 10, and the outlet holes 31He are disposed on the left side of the vehicle body 10. The gas is introduced from the right side of the vehicle body 10 to the inside of the battery casing 31, and then discharged to the left side. Since the fans 31F are attached to the outlet holes 31He, the fans 31F are disposed on the left side of the vehicle body 10. Therefore, it is possible to suppress an increase in dimension of the vehicle body 10 in the front and rear direction which may be caused by the fans 31F attached to the battery casing 31.

Figure 12:
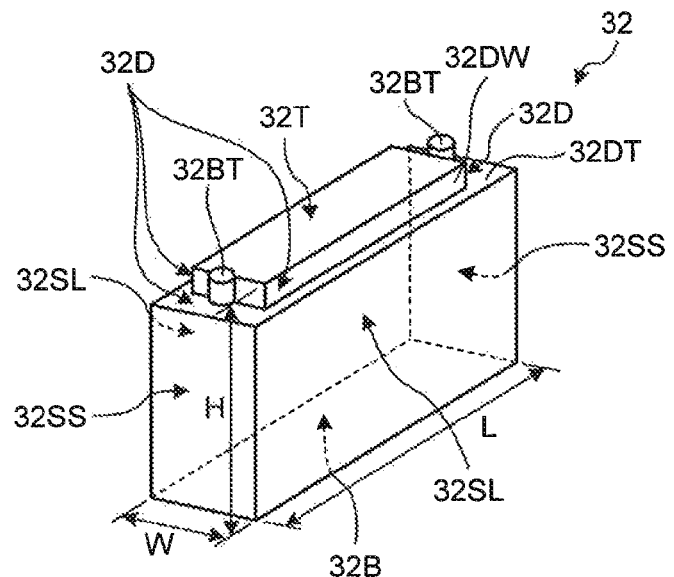
FIG. 12 is a perspective view illustrating an example of the battery cell which is included in the battery according to the embodiment.

FIG. 12 is a perspective view illustrating an example of the battery cell which is included in the battery according to the embodiment. The battery cell 32 has a substantially cuboid shape. The battery cell 32 includes a top surface 32T having a rectangular shape in plan view where terminals 32BT are provided, a bottom surface 32B having a rectangular shape in plan view which faces the top surface 32T, and four side surfaces 32SL, 32SL, 32SS, and 32SS having a rectangular shape in plan view which connect the top surface 32T and the bottom surface 32S. The battery cell 32 is configured such that the distance H between the top surface 32T and the bottom surface 32B is longer than the dimension W of the short side of the top surface 32T.

In the bottom surface 32B, dimension W of the neighboring side having a rectangular shape in plan view is smaller than dimension L of the other side. The dimension W refers to the width of the battery cell 32, and the dimension L refers to the length of the battery bell 32. Further, the distance (the shortest distance) H between the top surface 32T and the bottom surface 32B refers to the height of the battery cell. In other words, the battery cell 32 has the height H larger than the width W. In the embodiment, the length L of the battery cell 32 is larger than the height H. In other words, the battery cell 32 is a rectangular structure of which the length L is the largest, the width W is the smallest, and the height H is a value between the both values. The area of each of the facing side surfaces 32SL and 32SL is larger than that of each of the facing side surfaces 32SS and 32SS. In the following, the side surfaces 32SL and 32SL will be appropriately referred to as the large side surfaces 32SL and 32SL, and the side surfaces 32SS and 32SS as the small side surfaces 32SS and 32SS.

The battery cell 32 includes a stepped portion 32D between the top surface 32T and each of the side surfaces 32SL, 32SL, 32SS, and 32SS adjacent to the top surface 32T. The stepped portion 32D includes a stepped top surface 32DT which is parallel to the top surface 32T and the bottom surface 32B and stepped side surfaces 32DW which are straightened up from the stepped top surface 32DT. In the embodiment, the stepped side surfaces 32DW are substantially perpendicular to the stepped top surface 32DT.

The plurality of battery cells 32 are stored in the battery casing 31. Then, the respective terminals 323 of the battery cell 32 are connected to a third line 43, a first line 41, and a second line 43. In the battery casing 31, the first line 41, a second line 42, and the third line 43 are placed in the stepped portion 32D of the battery cell 32.

Figure 13:
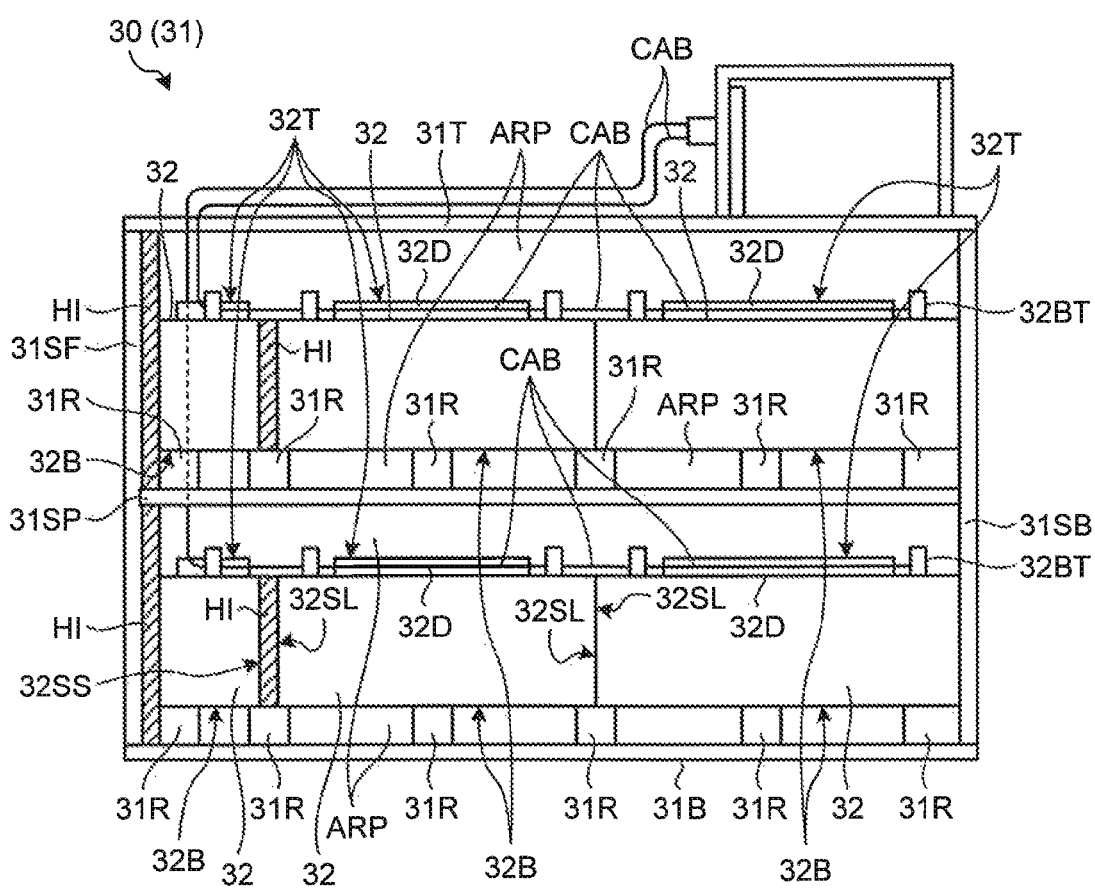
FIG. 13 is a diagram seen from arrow A-A of FIG. 9.
Figure 14:
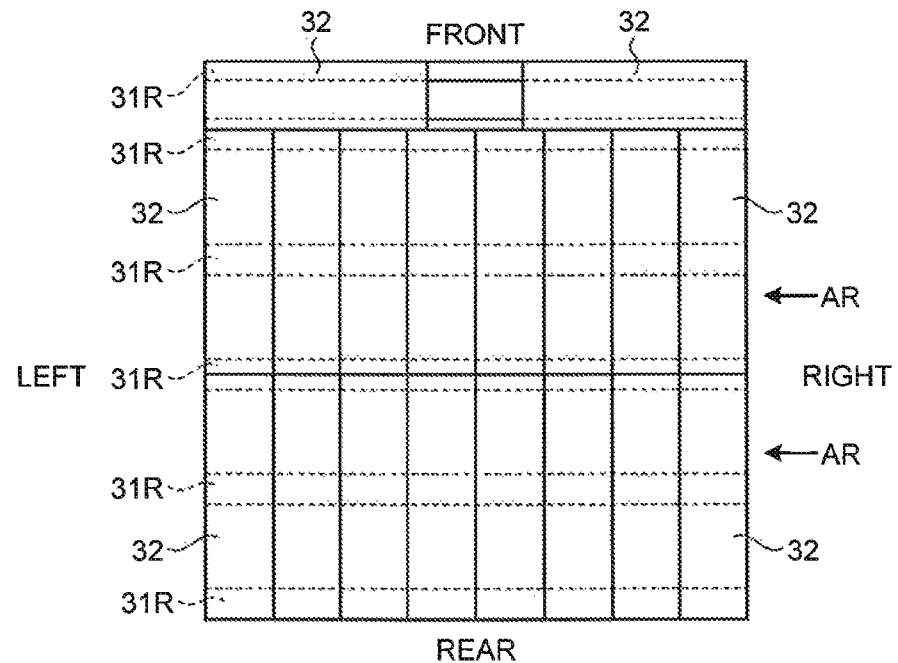
FIG. 14 is a diagram illustrating a relation between the battery casing and rails.
Figure 15:
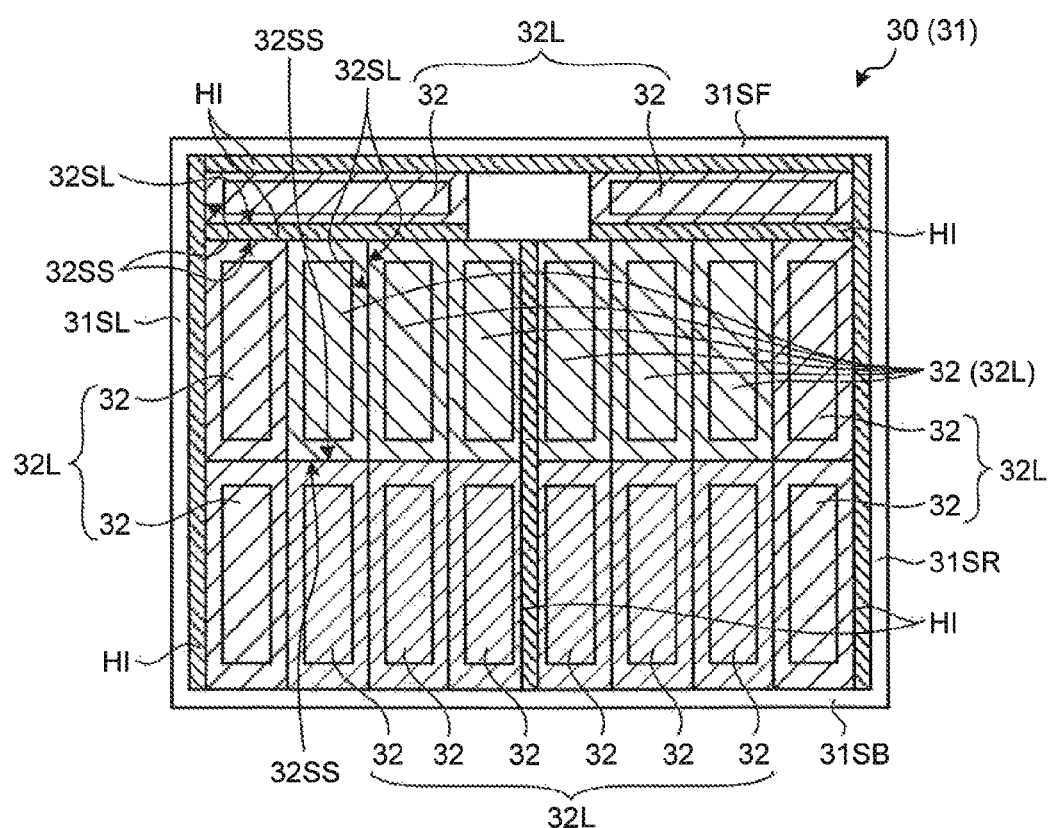
FIG. 15 is a plan view illustrating the battery casing of which the top is removed.

FIG. 13 is a diagram seen from arrow A-A of FIG. 9. FIG. 14 is a diagram illustrating a relation between the battery casing and rails. Arrow AR denoted in FIG. 14 illustrates the gas flow. FIG. 15 is a plan view illustrating the battery casing of which the top is removed. As illustrated in FIG. 13, in the embodiment, the battery casing 31 includes a partition member 31SP which partitions the inside of the battery casing 31 between the top 31T and the bottom 31B. The plurality of battery cells 32 are disposed between the top 31T and the partition member 31SP and between the partition member 31SP and the bottom 31B. The partition member 31SP is a plate-shaped member. The partition member 31SP has a rectangular (including square) shape in plan view. The partition member 31SP is disposed inside the sides 31SF, 31SB, 31SL, and 31SR of the battery casing 31.

The battery 30 includes a plurality of rails 31R as a plurality of rod-shaped members which are extended from the inlet holes 31Hi toward the outlet holes 31He illustrated in FIGS. 8 and 10. The plurality of rails 31R are provided on the surface of the partition member 31SP facing the top 31T of the battery casing 31. Similarly, the plurality of rails 31R are provided on the surface of the bottom 31B of the battery casing 31 facing the top 31T of the battery casing 31. In the embodiment, the plurality of rails 31R are disposed such that the extending direction (the longitudinal direction) thereof is parallel to the right and left direction (the width direction) of the battery casing 31.

As illustrated in FIG. 13, the respective rails 31R come in contact with the bottom surface 325 of the battery cell 32 to support the battery cells 32. Since the plurality of rails 31R are provided between the bottom surfaces 325 of the battery cells 32 and the partition member 31SP and between the bottom surfaces 32B and the bottom 31B, gas passages ARP each are formed between the bottom surfaces 32B of the battery cells 32 and between the bottom surfaces 32B and the bottom 31B for the ventilating of the gas. Further, the gas passages ARP each are formed also between the top 31T of the battery casing 31 and the top surfaces 31T of the plurality of battery cells 32 and between the partition member 31SP and the top surfaces 32T of the plurality of battery cells 32 for the ventilating of the gas.

With such a structure, the gas introduced from the inlet holes 31Hi into the battery casing 31 illustrated in FIGS. 8 and 10 flows in contact with the top and bottom surfaces 32T and 32B of the plurality of battery cells 32 disposed between the top 311 and the partition member 31SP, and with the top and bottom surfaces 32T and 32B of the plurality of battery cells 32 disposed between the partition member 31SP and the bottom 31B in the middle of passing through the gas passages ARP. In this way, the battery cells 32 are cooled down. Specifically, in a case where the battery 30 is charged in a boost mode, the respective battery cells 32 give off heat. Therefore, the flowing of the gas through the gas passages ARP causes the heat given off by the plurality of battery cells 32 to be released to the outside of the battery casing 31.

In the embodiment, the battery casing 31 includes four gas passages ARP. These gas passages ARP are preferably disposed such that the areas thereof perpendicular to the flow direction of the gas become equal. Since such a structure makes the amounts of gases flowing through the gas passages ARP equal, it is possible to suppress the variation in cooling among all the battery cells 32.

As illustrated in FIGS. 13 and 14, some of the rails 31R come into contact with the bottom surfaces 32S of tow battery cells 32, and the others come into contact with the bottom surfaces 32B of one battery cell 32. The respective rails 31R are extended from the inlet holes 31Hi toward the outlet holes 31He. For this reason, the plurality of rails 31R partition the gas passage ARP between the plurality of battery cells 32 and the partition member 31SP and the gas passage ARP between the plurality of battery cells 32 and the bottom 31B into a plurality of passages. With such a structure, the gas introduced from the inlet holes 31Hi into the battery casing 31 flows through the respective passages divided by the plurality of rails 31R. Therefore, it is possible to realize the uniform distribution of the gas in the direction perpendicular to the extending direction of the rails 31R. As a result, it is possible to suppress the variation in temperatures among the plurality of battery cells 32.

As illustrated in FIG. 13, power cables CAB which are connected to the positive and negative electrodes of the respective battery cells 32 are disposed along with the top surfaces 32T of the respective battery cells 32. In this way, since it is possible to suppress the power cables CAB from floating from the top surface 32T of the battery cells 32, the power cables can be suppressed from protruding into the gas passages ARP in the battery casing 31. Therefore, the cross-sectional area of the gas passage ARP are suppressed not to be lowered, thereby suppressing a decrease in flow rate of the gas passing through the gas passage ARP. As a result, the decrease in cooling efficiency of the plurality of battery cells 32 provided in the battery 30 itself can be suppressed; moreover, the variation in temperatures between the plurality of battery cells 32 can be suppressed.

As described above, in the battery casing 31, the power cables CAB are placed in the stepped portions 32D of the battery cells 32. For this reason, the first line 41, the second line 42, and the third line 43, that is, power cables CAB in the battery casing 31, can be prevented from protruding into the gas passages ARP in the battery casing 31. As a result, since the battery 30 is configured to suppress a decrease in flow rate of the gas passing through the gas passages ARP, it is possible to suppress a decrease in cooling efficiency and variation in temperature of the plurality of battery cells 32 provided in the battery itself.

In the embodiment, for example, as illustrated in FIG. 14, at least a part of the large side surfaces 32SL of eight battery cells 32 each are in contact so as to form columns (hereinafter, appropriately referred to as a cell column) of the battery cells 32. In the battery casing 31, the cell columns are disposed in two rows. Each cell column is disposed such that at least a part of the small side surfaces 32SS of the battery cells 32 are in contact. Further, two battery cells 32 are closely disposed to one cell column in the battery casing 31. The respective battery cells 32 are disposed such that at least a part of the respective large side surfaces 32SL is close to at least a part of the small side surfaces 32SS of the plurality of battery cells 32 included in one cell column.

The battery cells 32 which are disposed on both end sides of the cell, columns are arranged such that the large side surfaces 32SL only on one side come in contact with the large side surface 32SL of the adjacent battery cells 32, and the large side surfaces 32SL on the other side face any one of the sides 31SL and 31SR of the battery casing 31. Two battery cells 32 of which the large side surfaces 32SL come in contact with one cell column are disposed such that the large side surfaces 32SL not in contact with the small side surfaces 32SS face the side 31SF of the battery casing 31, and one of the small side surfaces 32SS faces any one of the sides 31SL and 31SR of the battery casing 31. Further, in the two battery cells 32, the small, side surfaces 32SS not facing the sides 31SL and 31SR face each other.

FIG. 15 illustrates the arrangement of the plurality of battery cells 32 provided on the upper portion of the above-mentioned partition member 31SP. The upper portion of the bottom 31B of the battery casing 31 also has a plurality of battery cells 32 disposed thereon similarly to the upper portion of the partition member 31SP. In the embodiment, since total 18 battery cells 32 are disposed on the upper portion of the partition member 31SP, total 36 battery cells 32 are disposed in the battery casing 31. As described above, the battery 30 is configured such that six battery cells 32 are connected in series to form one battery cell group 32L, and the plurality (6 in this embodiment) of battery cell groups 32L are connected in parallel. In the embodiment, the six battery cells 32 except the two battery cells 32 disposed on both end sides of the one cell column form one battery cell group 32L. Further, total six battery cells, that is, four battery cells 32 disposed on both end sides of the respective cell columns and two battery cells 32 of which the large side surfaces 32SL come in contact with the one cell column, form one battery cell group 32L.

In the embodiment, as illustrated in FIGS. 13 and 15, heat insulating materials HI are provided between the plurality of battery cells 32 and the inner sides 31SF of the battery casing 31. The heat insulating materials HI come in contact with the battery cells 32 and the sides of the battery casing 31. Further, the heat insulating materials HI are provided between some battery cells 32. The heat insulating materials HI suppress the heat of the battery cells 32 from being transmitted to the outside of the battery casing 31. In this way, the variation in temperatures of the battery cells 32 can be suppressed. In this way, since the variation in temperatures of the battery cells 32 at the time of charging is suppressed in particular, the variation in the charging rate and the decrease in durability of the battery cells 32 are effectively suppressed. Further, the heat insulating materials HI can serve to suppress the battery cells 32 not to move in the battery casing 31. Furthermore, in cases such that the battery-type forklift 1 makes a sudden start or a sudden stop, an impact applied on the battery cells 32 can also be alleviated.

The fans 31F are controlled by the in-vehicle controller 60 illustrated in FIG. 2. In the embodiment, the in-vehicle controller 60 makes control such that the gas is sucked from the inside of the battery casing 31 to cool down the plurality of battery cells 32 during a period when the plurality of battery cells 32 provided in at least battery 30 are being charged. In this way, since the variation in temperatures of the respective battery cells 32 can be suppressed at the time of charging, the variation in the charging rate and the decrease in durability of the battery cells 32 are effectively suppressed. In the embodiment, the in-vehicle controller 60 can also make control such that the gas is sucked from the inside of the battery casing 31 to suppress the battery cells 32 from being warmed up during a period when the plurality of battery cells 32 provided in the battery 30.

Figure 16:
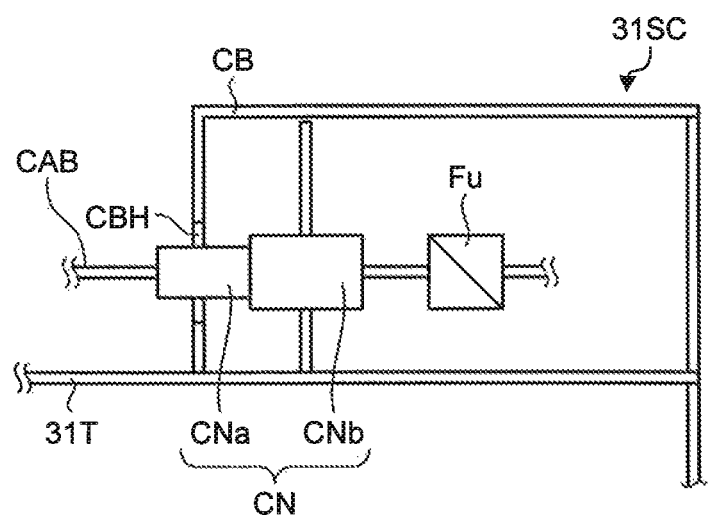
FIG. 16 is a diagram illustrating the structure of a storage casing.

FIG. 16 is a diagram illustrating the structure of the storage casing. The storage casing 31SC stores the fuses Fu therein. The fuses Fu correspond to the fuses Fu1, Fu2, Fu3, Fu4, Fu5, and Fu6 illustrated in FIG. 5. The fuses Fu are electrically connected to the terminals 32BT of the battery cells 32 through the power cables CAB. The power cables CAB drawn from the plurality of battery cell groups 32L and the fuses Fu are connected by connectors CN. The connector ON includes a first connector CNa and a second connector CNb. The power cable CAB is connected to the first connector CNa, and the fuse Fu is connected to the second connector CNb. The second connector CNb is attached to the storage casing 31SC.

The storage casing 31SC is attached with the cover CB. The cover CB includes an opening CBH through which the first connector CNa passes. The first connector CNa passes the opening CBH and is plugged into the connector CNb. The cover CB needs to be removed in a case where the cover CB is removed for inspecting the inside of the storage casing 31SC. When the cover CB is removed in a state where the first connector CNa is connected to the second connector CNb, the first connector CNa is engaged with the opening CBH of the cover CB. Therefore, the cover CB cannot be removed as long as the first connector CNa is not removed from the second connector CNb. When the first connector CNa is removed from the second connector CNb, the cover CB can be removed. When the first connector CNa is removed from the second connector CNb, the electric power from the battery cells 32 is not applied to the fuses Fu. Therefore, there is no danger even when the components in the storage casing 31SC are touched.

In the embodiment, the first connector CN is provided in the opening CBH formed in the cover CB of the storage casing 31SC for the connection to the power cables CAB of the battery cell 32. With such a structure, the cover CB cannot be removed as long as the first connector CNa is removed from the second connector CNb, thereby improving the safety.

As illustrated in FIG. 6, the storage casing 31SC is provided on the rear side of the battery casing 31. With respect to the relation with the vehicle body 10 of the battery-type forklift 1 illustrated in FIG. 2, the storage casing 31SC is provided on the rear side of the vehicle body 10. The battery 30, as illustrated in FIG. 2, is provided under the driver seat 34 of the battery-type forklift 1. When the cover GB of the storage casing 31SC is removed for the exchanging of the fuses Fu or the like, as illustrated in FIG. 2, the driver seat 34 is made to rotate about the center of a support shaft 33a to release the top of the battery 30. At this time, since the storage casing 31SC is provided on the rear side of the vehicle body 10, the storage casing 31SC of the work vehicle can be easily accessed. Therefore, the exchanging of the fuses Fu or the inspection of the storage casing 31SC can be easily performed.

The battery casing 31 is configured such that the variation in temperatures of the battery cells 32 at the time of charging can be suppressed by the heat insulating materials HI and the fans 31F. Therefore, the variation in the charging rate and the decrease in durability of the battery cells 32 are effectively suppressed. For this reason, the in-vehicle controller 60 illustrated in FIG. 2 will no longer be necessary to make parallel control at the time of charging the battery 30, and thus the control can be simple at the time of charging. Parallel control refers to control in which a charging volume is regulated to make the charging volume equalized in each battery cell in a case where a battery having the plurality of battery cells connected in parallel is charged. In a case where the battery cells 32 are cooled down using the fans 31F, it is preferable to provide a gap between the adjacent battery cells 32. However, the gap will cause an increase in dimension of the battery casing 31. Since the battery-type forklift 1 is required to have an ability to turn in a small radius, the vehicle body 10 is preferably made as compact as possible. Further, since the battery-type forklift 1 stores the battery 30 under the driver seat 34, when the gap is provided between the battery cells 32, there may not be stored with an enough quantity of the battery cells 32 that the forklift needs.

Therefore, in the embodiment, the battery cells 32 forming a cell column are stored in the battery casing 31 in a state where at least some of four side surfaces 32SL, 32SL, 32SS, and are intentionally brought into contact with each other at least partially battery casing. In this way, since there is no need to provide the gap between the battery cells 32, it is possible to suppress an increase in dimension of the battery casing 31. Then, the gas flows in contact with the top and bottom surfaces 32T and 32B of the battery cells 32, thereby cooling down the respective battery cells 32. In this way, the battery 30 can be realized to suppress an increase in dimension and to secure the cooling of the battery cells 32 at the same time.

In the embodiment, the battery casing 31 may not be provided with the partition members 31SP. In other words, the plurality of battery cells 32 may be disposed in only one stage between the top 31T and the bottom 31B rather than the respective stages on both sides of the top 31T and the bottom 31B. Further, the plurality of fans 31F may blow the gas into the battery casing 31 instead of sucking the gas from the inside of the battery casing 31.

In a case where the battery 30 is charged in the boost mode using the charging device 2, heat values of the power conversion unit 73 and the like increase compared with those in a normal charging, so that, the apparatus increases in size. In a case where the charging device capable of being charged in the boost mode is built in the battery-type forklift 1, the mass will increase in addition that the battery-type forklift 1 itself increases in size. Therefore, the running hours of the battery-type forklift 1 may be shortened. In the embodiment, since the charging device 2 is a stationary type, the charging device capable of being charged in the boost mode is not necessarily built in the battery-type forklift 1. As a result, it is possible to perform the management on the battery 30 while suppressing the battery-type forklift 1 from being large and suppressing the running hours from being shortened due to the increased mass.

Here, a case will be considered in which the stationary charging device 2 is used, a maintenance center manages the battery 30 through a communication manner to prevent defects attributable to the battery 30 for the preservation of it. In this case, the charging device 2 is also necessarily built with a communication apparatus. In the embodiment, the in-vehicle controller 60 illustrated in FIG. 4 controls the charging device 2, and collects information about the charging such as the charging conditions of the battery 30 and a failure in connection between the charging connector 23 and the charging device-side connector 24. Then, the in-vehicle controller 60 can transmit the information about the battery 30 to the maintenance center using the communication apparatus 64. In this way, the battery-type forklift 1 is configured such that the in-vehicle controller 60 makes control on the charging of the battery 30 and collects the information about the battery 30. Therefore, the battery 30 can be managed using the communication apparatus 64, and the defects attributable to the battery 30 can be prevented for the preservation of it. As a result, there is no need to build the communication apparatus in the charging device 2.

In a case of the management of the battery 30, the in-vehicle controller 60 collects, for example a charging frequency, a full charging frequency, a total discharging amount, a charging or discharging period, and the like as information for the management, and transmits the collected information to the maintenance center through IC the communication apparatus 64. In a case of the management of the defects attributable to the battery 30, the in-vehicle controller 60 collects, for example, a history of errors and transmits the history to the maintenance center through the communication apparatus 64. In a case of the prevention of the defects attributable to the battery 30, the in-vehicle controller 60 collects, for example, a history of failures of the charging attributable to the connection error between the charging connector 23 and the charging device-side connector 24, and transmits the history to the maintenance center through the communication apparatus 64.

Hereinbefore, the descriptions have been made about the embodiment, but the above-mentioned descriptions do not limit the embodiment. Further, the above-mentioned components include those capable of being conceived by a person skilled in the art, those substantially equal to the descriptions, and those falling within a range of so-called equivalents. Furthermore, the above-mentioned components may be formed by an appropriate combination thereof. In addition, various omissions, substitutions, or modifications of the components can be made without departing from the scope of the embodiment.

REFERENCE SIGNS LIST

1 BATTERY-TYPE FORKLIFT
2 CHARGING DEVICE
6 AC POWER SUPPLY
10 VEHICLE BODY
13 FORK
23 CHARGING CONNECTOR
24 CHARGING DEVICE-SIDE CONNECTOR
30 BATTERY
31 BATTERY CASING
31F FAN
31B BOTTOM
31Hi INLET HOLE
31SP PARTITION MEMBER
31B BOTTOM
31R RAIL
31T TOP
31SF SIDE
31He OUTLET HOLE
32 BATTERY CELL
32B BOTTOM SURFACE
32SL SIDE SURFACE (LARGE SIDE SURFACE)
32SS SIDE SURFACE (SMALL SIDE SURFACE)
32T TOP SURFACE
32BT TERMINAL
34 DRIVER SEAT
60 IN-VEHICLE CONTROLLER
61 COMMUNICATION CONTROLLER
62 POWER SUPPLY
63 START CIRCUIT
64 COMMUNICATION APPARATUS
66, 69 CONTACTOR
67 POWER LINE
67C CHARGING POWER LINE
68 COMMUNICATION LINE
70 CONTROL UNIT
71 CHARGER POWER SUPPLY
72 START SIGNAL GENERATING UNIT
73 POWER CONVERSION UNIT
74 SENSOR
76 POWER SUPPLY LINE
76B POWER LINE
77 COMMUNICATION LINE

The invention claimed is:

1. A work vehicle which is provided with a battery and at least one motor, the motor being driven by electric power supplied from the battery, the work vehicle comprising:
a charging terminal to which a feed terminal provided in a charging device disposed at an outside of the work vehicle is connected at a time of charging the battery;
a communication terminal to which a communication terminal for the charging device to communicate with the work vehicle is connected at the time of charging the battery;
an in-vehicle controller which controls the work vehicle, and controls the charging device through the communication terminal at the time of charging the battery;
a start unit which makes the in-vehicle controller start in response to a signal from the charging device at the time of charging the battery;
a signal terminal which is connected to a terminal to transmit a signal from the charging device at the time of charging the battery; and
a switch which is provided between the charging terminal and a terminal of the battery,
wherein the in-vehicle controller makes the switch enter into a connection state after starting by the start unit, and
wherein when the switch enters into the connection state, the battery supplies electric power to be consumed by a control unit which is provided in the charging device to control the charging of the battery, and
wherein the in-vehicle controller makes the control unit start the charging.

2. The work vehicle according to claim 1,
wherein the charging terminal, the communication terminal, the signal terminal are disposed in a same connector.

3. The work vehicle according to claim 1,
wherein the in-vehicle controller,
makes the charging device start charging of the battery when a start completion signal is received from the charging device through the communication terminal, and
makes the charging device stop charging of the battery when a charge amount of the battery is equal to or more than a predetermined amount.

4. The work vehicle according to claim 3,
wherein the in-vehicle controller makes the switch enter into a non-connection state to stop supplying of the electric power to the charging device when a stop signal is received from the charging device.

\* \* \* \* \*